United States Patent Office 3,573,934
Patented Apr. 6, 1971

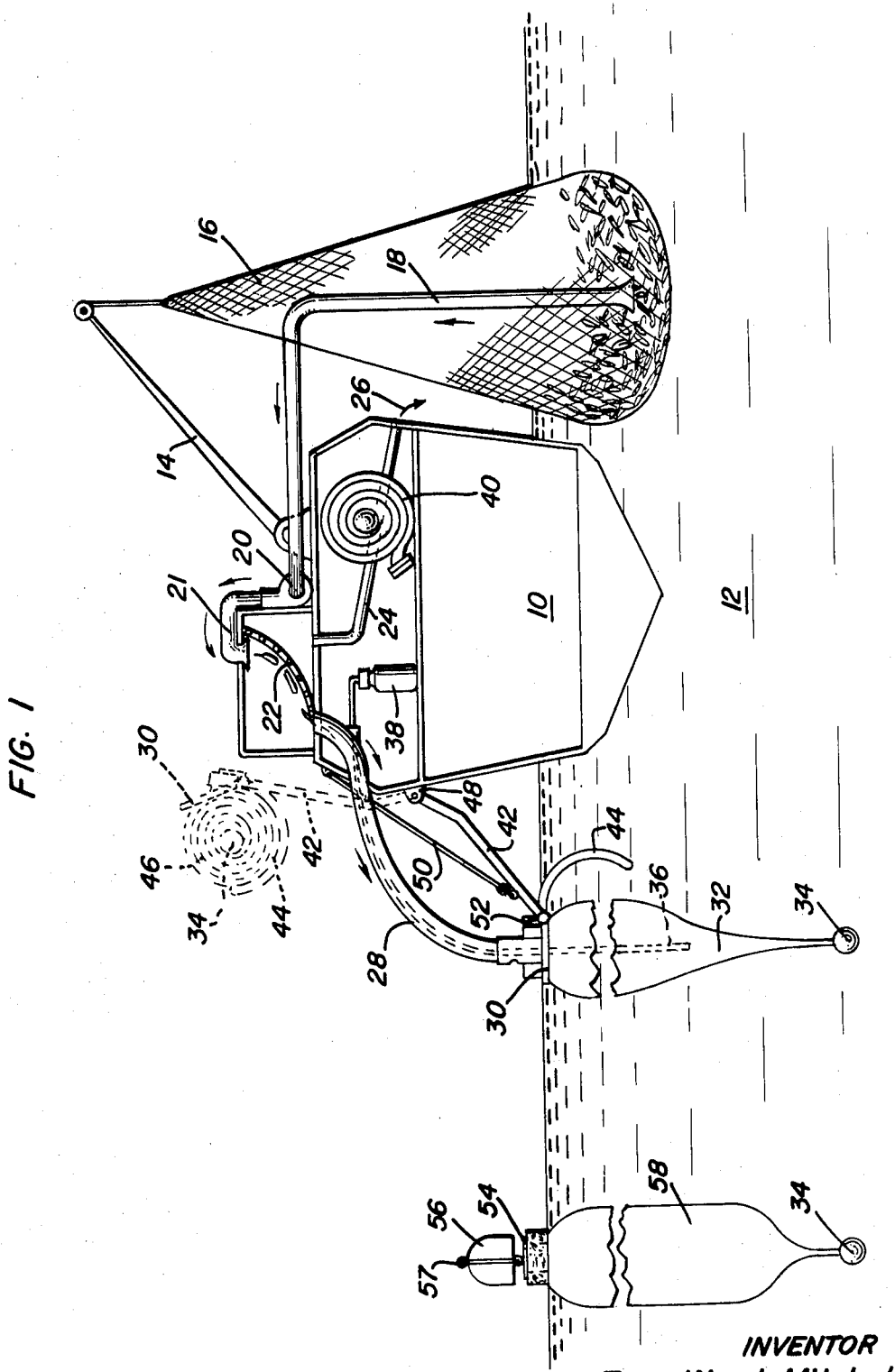

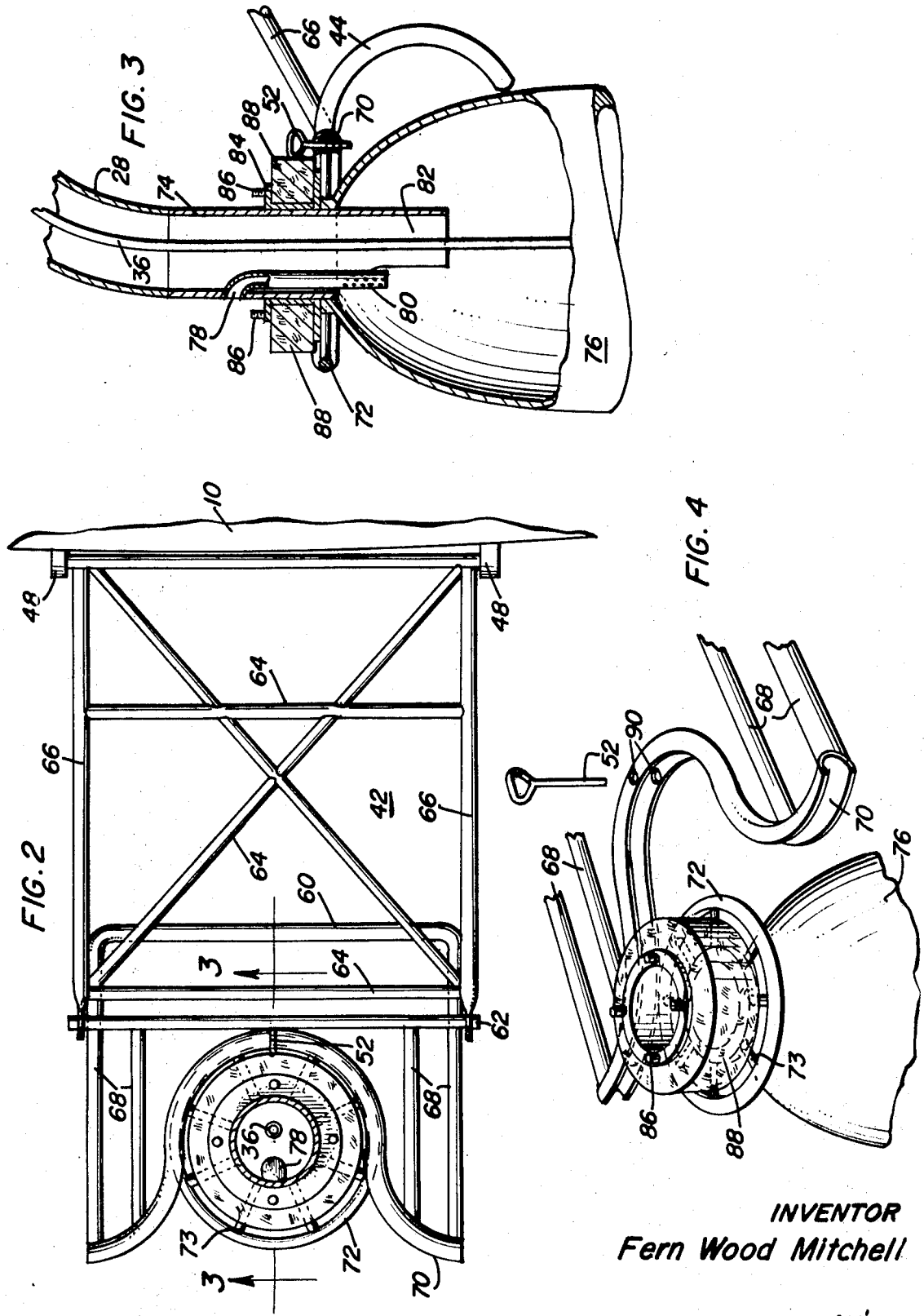

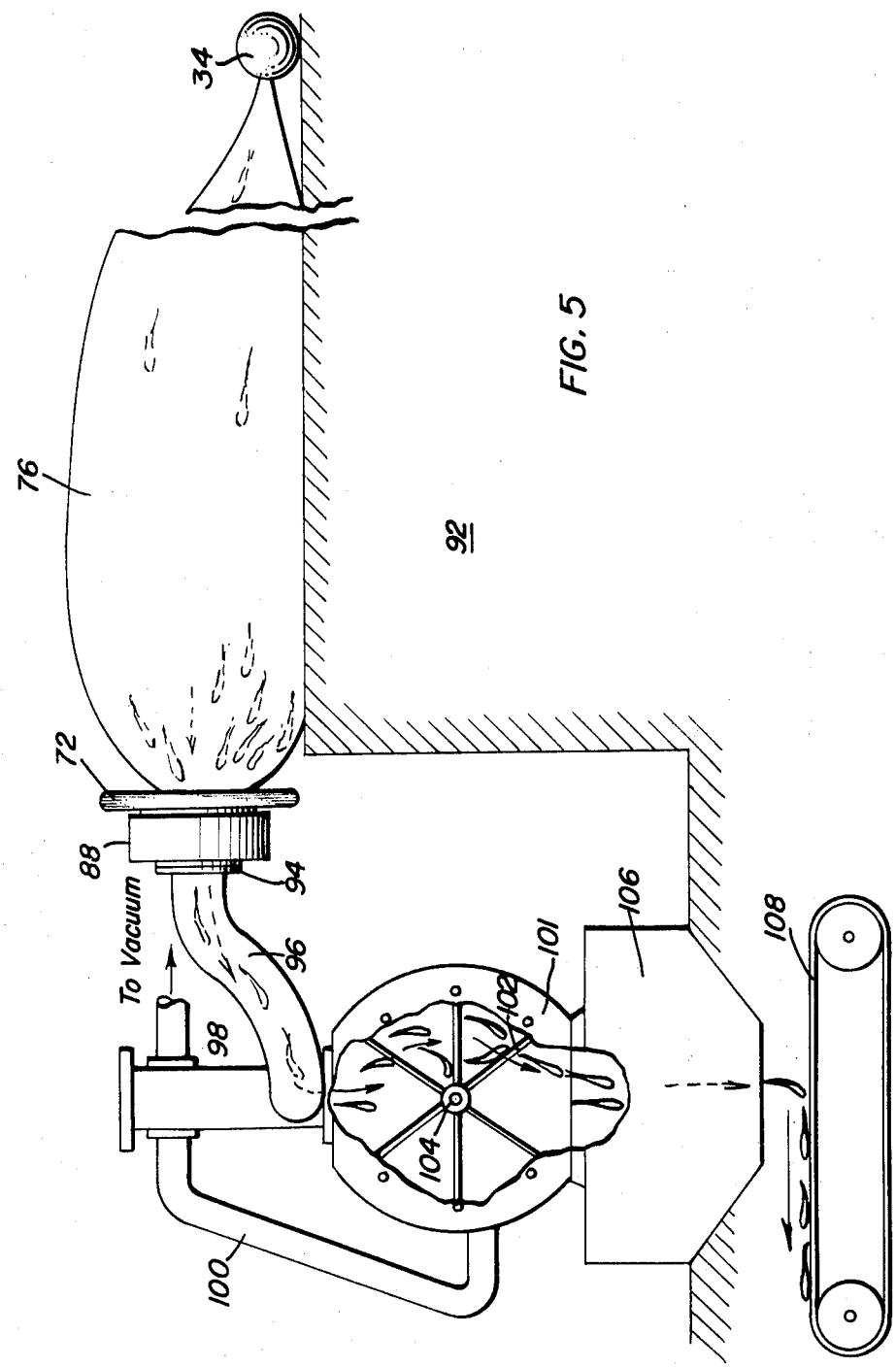

3,573,934
METHOD FOR TRANSPORTING AND STORING AQUATIC FAUNA AND PRESERVING THE SAME
Fern Wood Mitchell, Washington, D.C., assignor to W. R. Grace & Co., New York, N.Y.
Filed July 19, 1968, Ser. No. 746,180
Int. Cl. A23b 3/12
U.S. Cl. 99—158    2 Claims

ABSTRACT OF THE DISCLOSURE

The disclosed invention is directed to a method and apparatus for transporting and storing aquatic fauna which includes means for removing aquatic fauna from the aquatic environment, separating the fauna from any residual materials, transferring the fauna to a large flexible elongated storage vessel vertically disposed in the aquatic environment, and when the storage vessel is filled, towing same to a processing station. The present invention also provides a method for preserving the aquatic fauna while in storage.

---

This invention relates to a method and apparatus for transporting and storing aquatic fauna by means of a large flexible elongated storage vessel. More particularly, the present invention provides a method and apparatus for transporting and storing aquatic fauna which includes means for removing aquatic fauna from an aquatic environment, separating the fauna from residual materials, transferring the aquatic fauna to a large flexible elongated storage vessel vertically disposed in the aquatic environment, and when the storage vessel is filled, towing same to a processing station. The present invention further provides a method for preserving the aquatic fauna while in storage.

Conventionally, commercial fishing has been conducted by use of large fishing barges, boats, or vessels generally all having a fixed capacity for storing fish. Once the storage capacity of these vessels is filled, the vessel is forced to return to a sheltered harbor to unload the fish. The vessel must dock in a harbor sufficiently sheltered to enable the vessel to tie up without damage during the unloading operation.

In many parts of the world where large catches of good edible fish become available in short seasons, frequent returns to port limit the amount of fish which may be caught. Such operations are thus generally inefficient and highly uneconomical due to great loss of time with frequent abandoning of vast schools of fish.

In the case of long fishing trips at sea it is not practical for the vessel to return to port promptly because of the great distance of the fishing site from the port. Thus, a certain percentage of the fish decomposes and is wasted thereby decreasing the profit of the trip.

It has now been found that by the practice of the present invention, commercial fishing may be performed without need for vessels having large fixed storage facilities for returning fish to a sheltered harbor. Further, frequent returns of the fishing vessel are eliminated thus providing a generally efficient, highly economical operation without great loss of fish due to decomposition in storage and transfer to shore. The present invention overcomes defects in conventional fishing methods heretofore employed by use of a large flexible elongated storage vessel which may be folded or otherwise collapsed into a relatively compact volume when empty and which may be usefully employed for storing and transporting large quantities of fish from the fishing grounds when filled. The elongated storage vessels of the present invention may be singularly towed by a vessel or may be towed in a series from the fishing grounds to processing facilities. The present flexible vessels are very resistant to damage by contact with the bottom and may therefore be towed to or near the edge of the water, close enough to dry land to enable unloading. These vessels may also be unloaded on land by any desirable means.

Generally stated, the present invention provides a method and apparatus for storing and transporting aquatic fauna by means of an elongated flexible vessel formed of a closed tube of flexible material such as natural or synthetic rubber impregnated fabric. The present invention also provides means for removing fauna from an aquatic environment, means for separating the fauna from residual materials, means for transferring the fauna to a large flexible elongated storage vessel vertically disposed in the aquatic environment and when the storage vessel is filled, the vessel is sealed and may be towed by a provided towing means to a processing station. Additionally, the present invention includes means for preserving the stored fish while in the flexible vessel. When the flexible vessel is received at the processing station, the fish may be unloaded by any suitable means and the flexible vessel may then be folded or rolled into a compact volume for return to the fishing site. Thus, the flexible vessel in compact position occupies a small volume relative to the potential storage capacity and a number of such vessels may be transported to a fishing site on a vessel which is small, relative to the total storage capacity of the flexible vessels when filled.

Although the present invention may be used to store and transport almost any form of aquatic fauna, for convenience herein the invention will be described merely with regard to fish. Similarly, almost any aquatic environment may be involved but for simplicity, the description of the invention will be directed simply to a water operation.

Practice of the present invention will become more apparent from the following detailed description taken in connection with the accompanying drawings wherein like numerals referred to similar elements throughout the several views.

FIG. 1 diagrammatically illustrates the present invention as a sequence of events which may take place at a fishing site;

FIG. 2 illustrates a top elevational view of a means for retaining and lowering a flexible vessel from a fishing vessel;

FIG. 3 is a partial front elevational view taken along section lines 3—3 of FIG. 2;

FIG. 4 is a perspective view further illustrating means by which a flexible vessel may be retained in association with a fishing vessel; and FIG. 5 illustrates generally a suitable means for unloading sorted fish at a processing location.

Referring to the drawings, FIG. 1 illustrates fishing vessel 10 floating in water 12. The fishing vessel may include crane 14 for elevating fishing net 16 containing fish generally illustrated. Disposed within net 16 is a vacuum line 18 for removing netted fish by pump 20 which passes fish to an arcuate screen 22 for separating the fish from any residual materials including water. The removed materials may be returned by drain line 24 to the water as indicated by arrow 26. The fish, substantially free of water, may be transferred from screen 22 by gravity or other suitable means to flexible fish conveying tube 28 positioned within top end 30 of large flexible elongated storage vessel 32. The storage vessel is illustrated vertically positioned in the water by means of weight 34 position near a bottom end thereof. An example of a useful measure of weight for vertically positioning the elongated vessel is about 50 to about 100 pounds.

The flexible vessel suitable for use herein may be those manufactured by Dracone Developments, Ltd., London, England. In their preferred form such vessels consist of a flexible elongated envelope of a fabric coated on the inside with an elastomer impervious to the cargo to be carried by the barge, while the outside surface is coated with an elastomer impervious to water and sunlight. When loaded, the envelope assumes a generally tubular form for at least a substantial part of its length. The ends of the envelope are preferably tapered and secured to rigid end structures which either include, or are suitable for the attachment of, a towing eye and/or a filler pipe. Vessels of this type have been designed for use heretofore for transporting liquid cargoes. More detailed descriptions of the preferred barge may be found in U.S. Patents 3,224,403; 3,167,103; 2,998,792; and 3,056,373.

The present vessel may be constructed by weaving in one piece as a continuous tube a fabric strength giving layer which may be provided with a skin material impervious to water. The fabric is preferably nylon or some other related material. The fabric is generally characterized as one which will permit vessel expansion without rupture in the order of about 10% to about 20%. The fabric may be coated with walls made of a flexible artificial synthetic material which is resistant against chemical action by the transported fish, and also resistant against the action of salt water, light and atmospheric conditions. Synthetic resins are suitable, for example polyethylene, polyisobutylene, polyvinylchloride, polyamide, polyurethane, polytetrafluoroethylene, silicone resins, synthetic rubber, such as butadiene rubbers, and the like. The walls may consist of one or several layers of such materials, and are advantageously provided with fabric reinforcements which may consist of synthetic or natural substances. The layers may be made of different materials, for example the inner layers are made of materials resistant against the transported fish and the outer layer, or layers, may be resistant against salt water and mechanical impacts.

The walls of the present vessel are dimensioned in accordance with the volume. The walls may be made by pressing, blowing, or injection molding or may be made of several pieces which are connected by fusion, or by an adhesive connection to form a closed cell.

The vessel may generally be of a diameter up to about 30 feet and a length of up to about 600 feet long. The length to diameter is large (20 to 1 for example) for economy in thickness of material because tension due to hydrostatic pressures is proportional to the square of the diameter and is not a function of the length. The stress due to towing or drag is a function of the length but this is small compared to the tension due to hydrostatic pressure. Hence to achieve large capacity for a given amount of material and for ease of storage and winding, the tube is several diameters long.

Other shapes of vessels may be constructed of a suitable forming to minimize drag, tension and distortion of the fabric envelope.

If desired, the flexible vessel may include various attachments to limit stress and unnecessary movement when in tow.

Fish transfer tube 28 may include in association therewith a preservative supplying tube 36. The preservative may be received from tank 38 position on the fishing vessel. Chemical preservatives such as formaldehyde, sodium chloride, sodium nitrite, sodium hydroxide and various other organic and inorganic preservatives may be used although it is recognizable that these preservatives may change the nature of the fish drastically. Ammonia is a preferred preservative. It has been found that when fish are treated with about 0.1 to about 1% by weight ammonia the natural deteriorative processes are slowed down or stopped even at tropical sea temperatures. Preferably, about 0.3–1% by weight ammonia is used. The fish may be sprayed with the ammonia, and then stored without further treatment or special equipment.

Further illustrated on the fishing vessel is a flexible elongated storage vessel 40 as it may appear when in rolled or folded position occupying a minimum amount of volume when not in use. It is thus apparent that a series of such flexible containers may be transported on a relatively small fishing vessel and, when filled, return to port with vast quantities of fish.

The elongated vessel 32 may be secured in relative position to fishing vessel 10 by any suitable means such as by rack 42 with associated arcuate bar 44 suitably positioned for supporting a folded or rolled vessel 46, illustrated in phantom, when the rack is in raised or vertical position prior to being lowered to the water. Suitable pivot means 48 may be included to permit rack 42 to be raised to vertical position. When rack 42 is lowered, rolled flexible vessel 46 merely unfolds and the lower end is drawn down into the water by weight 34, thereby forcing any entrapped air out of the flexible vessel. The flexible vessel eventually assumes a vertical position in the water, suspended on the surface of the water by the permanently attached float 88, and positioned with respect to the fishing vessel by a pivoted yoke. Other associated elements may be included as desired.

After the vertically disposed vessel is filled with fish, fish transfer tube 28 is removed and a suitable sealing cap 54 is positioned over the filling end of the vessel. Sealing cap 54 may include a flotation means 56 associated therewith, if desired, and tow means 57 illustrated as a towing eye. The filled vessel may be released from rack 42 by removing pin 52 thus permitting the filled vessel to float freely in the water while the fishing operation continues. At a convenient time vessel 58 may be retrieved and returned to a processing location such as at shore for the further processing.

The filled flexible vessels remain substantially at the surface of the water, suspended at the top by floats 56 and 88 and oriented vertically by weight 34. The specific gravity of the flexible vessel itself, neglecting its permanently attached float 88 is slightly greater than water. However, the specific gravity of the contained aquatic fauna may vary due to many factors including species, maturity, feeding cycle or breeding cycle. Therefore, the precise weight necessary at the bottom and precise buoyancy of the float at the top may be different from one fishery to another. However, when the relative weights and buoyancies are properly balanced, the vessel will remain vertically oriented when at rest in the water, but when towed the length of the vessel will rise substantially to the surface and present a minimum drag to the towing vessel. The flexible vessel thus extends behind the towing vessel essentially at the surface. The rear portions of the barge may rise to the surface during the towing operation due to the hydrodynamic forces caused by movement of the barge through the water.

The vessel may be towed by means of a cable or rope which is attached to the towing eye 57. Generally, the nose shape of the vessel and attachment of the tow rope is designed to distribute the towing load uniformly. Since the vessel may roll in heavy sea, a tow cable which connects the vessel to, for example a tug boat, is preferably provided with a coupling means which include swivels.

FIG. 2 illustrates the rack 42 having pivotal means 48 for connection to fishing vessel 10. Rack 42 may be further pivoted to flexible vessel engaging means 60 by bar 62. Rack 42 includes reinforcing elements 64 within parallel legs 66.

Other means may be used to retain the flexible vessel in association with the fishing vessel during the loading operation as desired.

Flexible vessel engaging means 60 may include any suitable reinforcing elements 68. The engaging means 60 desirably includes a modified U shaped channel element 70 with pin 52 in position for securing rim 72 within channel 70. Rim 72 may include radial element 73 if desired.

FIG. 3 more clearly illustrates how the flexible vessel may be loaded by fish transport tube 28, and various elements associated therewith. Fish transport tube 28 may include an insert section 74 for positioning within an open mouth portion of flexible vessel 76. Conveniently, insert section 74 includes air outlet 78 having perforated section 80 to permit a means for air to be released from the flexible vessel during the filling operation. Insert section 74 may also have section 82 open for rapid filling of fish.

Disposed about the open mouth portion of flexible vessel 76 is annular channel 84 having studs 86 positioned thereon to receive a vessel sealing means.

Because it has been observed that due to the differences in specific gravity between fish and water, at times the buoyancy of the permanently attached float 88 is not sufficient to reliably float the filled vessel. Therefore, float 56 is attached to the towing ring in the cover 54. Float 56 may be formed of cork, wood, plastic foam or the like. Air or gas expandable floats may also be used thus permitting the float to be used during the free-floating period and removed or compressed during the towing operation. When the float is removably secured to the flexible vessel, it may be removed to limit drag during towing. Alternatively, the float may be designed to aid the towing operation by providing hydrodynamic features.

FIG. 4 illustrates in perspective how flexible vessel 76 may be secured by pin 52 in provided holes 90 of channel member 70.

FIG. 5 illustrates one means, generally preferred, by which flexible vessel 76 may be emptied of fish. The vessel 76 may be positioned on platform 92 and the sealing means over the open mouth position is then removed. Within the open mouth portion of the vessel is inserted end 94 of vacuum fish transport tube 96 from vacuum stand 98. Star valve 102 is rotated about axle 104 by any suitable power means not shown. Fish are transferred by star valve 102 as indicated to sump 106 and then by belt 108 to further processing as desired. Additionally, vacuum return line 100 from housing 101 for star valve 102 may be used to limit vacuum loss during fish transfer.

The practice of this invention is substantially as follows: The empty flexible vessel is rolled up and kept on the deck or in the hold of the fishing vessel. When fish are captured in the normal way, such as in nets and the like, the rolled flexible vessel is swung over the side of the fishing vessel in such a way that the empty flexible vessel hangs dependent into the water. The bottom of the flexible vessel is weighted so that the barge is kept in a substantially vertical position. The rigid end structure of the flexible vessel is coupled to piping leading back to the deck of the ship. The fish are then unloaded from the nets in the normal fashion, for instance, by pumping seawater slurry of fish to a dewatering screen located high upon the ship from whence the fish, separated from the bulk of the water flow by gravity, not as is normal into the hold of the ship, but into the mouth of the piping leading to the flexible vessel. After the flexible vessel is filled, the mouth of the vessel is secured with a suitable closure and fastened to a tow ship by means of a tow line. When the barge is pulled along behind the ship, it moves along substantially on the surface of the water.

Where a smooth beach or concrete ramp is available, a large piece of net or fabric may be laid out which extends from the edge of the water out a distance at least as great as the length of the flexible vessel. The loaded flexible vessel is towed towards the edge of the water directly over this net or fabric until it grounds. The net or fabric is then pulled up the ramp or beach by a winch, moving the flexible vessel with it but protecting it from abrasion and damage. At a suitable point up the ramp or beach a sump has been prepared with a means of moving the fish from the sump into the subsequent plant or process. When the mouth of the flexible vessel is over the sump, it is opened. The contents of the flexible vessel are then forced out into the sump either by lifting the tail of the vessel, by rolling the tail up onto the body of the vessel, or preferably by vacuum.

An alternate method of unloading using a smooth beach or ramp is to ground the flexible vessel essentially sideways at the edge of the water. The flexible vessel is then rolled sidewise up the beach, slightly off from the perpendicular to the slope so that the mouth of the flexible vessel is lower than the remainder. This rolling is preferably done by previously positioning a piece of netting substantially as wide as the flexible vessel is long and extending from the point on the beach to which the flexible vessel is to be rolled out far enough beyond the point at which the vessel will ground to allow the net to be wrapped half around the vessel when it has been grounded. The lower end of the net is fixed to the ground. When the upper edge has been wrapped half around the vessel, it is attached to ropes which by winches or other means draw the net up the beach rolling the vessel inside it. When the vessel has been rolled sufficiently far up the beach or ramp so that its nose is over a sump previously prepared, the mouth is opened and the fish allowed to run out by gravity into the sump.

A third method, generally preferred, comprises towing of the vessel toward the edge of the water until it is grounded. A suitable pump is then attached to the mouth and suction started. As the pressure inside the vessel is reduced, the force of the atmosphere on the flexible walls of the vessel force the contents to the pump which then removes them. In some cases it may be necessary to lift or roll up the nearly empty tail end of the vessel to force the last of the contents to the suction point of the pump.

It is understood that the foregoing detailed description is given merely by way of illustration and that many variations may be made therein without departing from the spirit of this invention.

What is claimed is:

1. A method for transporting and storing aquatic fauna which comprises:
    (a) removing aquatic fauna from an aquatic environment,
    (b) separating the fauna from residual materials,
    (c) transferring the fauna after separation from residual materials to a large flexible elongated storage vessel, the same being impervious to water and sunlight and which is vertically disposed in the aquatic environment; sealing the vessel when the same is filled for towing in the aquatic environment; and (d) adding gaseous ammonia preservative to the fauna during transfer of the fauna to the storage vessel.

2. The method of claim 1 wherein the ammonia preservative is present in an amount from about 0.1% to about 1% by weight of aquatic fauna.

References Cited

UNITED STATES PATENTS

| | | | |
|---|---|---|---|
| 1,119,398 | 12/1914 | Bullot | 99—225 |
| 2,193,622 | 3/1940 | Coulter | 99—221 |
| 2,402,199 | 6/1946 | Macdonald | 99—188 |
| 2,622,030 | 12/1952 | Frandsen | 99—155 |
| 3,341,280 | 9/1967 | Eolkin | 21—58 |
| 3,054,678 | 9/1962 | Michener et al. | 99—150 |
| 3,162,020 | 12/1964 | Beckmann | 62—240 |
| 3,180,738 | 4/1965 | Lassen | 99—111 |
| 3,249,442 | 5/1966 | Keyes et al. | 99—18 |
| 3,306,256 | 2/1967 | Lewis | 119—3 |

FOREIGN PATENTS

| | | | |
|---|---|---|---|
| 228,438 | 6/1960 | Australia | 99—158 |
| 926,453 | 5/1963 | Great Britain | 99—158 |

NORMAN YUDKOFF, Primary Examiner

F. E. DRUMMOND, Assistant Examiner

U.S. Cl. X.R.

99—171, 225; 119—3